(12) United States Patent
Yokoi et al.

(10) Patent No.: US 8,141,792 B2
(45) Date of Patent: Mar. 27, 2012

(54) PRESSURE CONTROLLER, VALVE HAVING PRESSURE CONTROLLER, AND FUEL CELL EQUIPPED WITH VALVE HAVING PRESSURE CONTROLLER

(75) Inventors: Akiyoshi Yokoi, Kawasaki (JP); Toru Nakakubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 11/514,924

(22) Filed: Sep. 5, 2006

(65) Prior Publication Data

US 2007/0056634 A1    Mar. 15, 2007

(30) Foreign Application Priority Data

Sep. 13, 2005   (JP) .................................. 2005-265788
Aug. 29, 2006   (JP) .................................. 2006-232820

(51) Int. Cl.
G05D 23/00   (2006.01)
G05D 23/02   (2006.01)
F02D 41/38   (2006.01)
F04B 45/00   (2006.01)

(52) U.S. Cl. .......... 236/94; 236/93 R; 123/464; 417/395
(58) Field of Classification Search ................ 236/93 R, 236/101 R, 101 C, 94; 123/464, 513; 417/395
See application file for complete search history.

(56) References Cited

U.S. PATENT DOCUMENTS

| 5,325,880 A * | 7/1994 | Johnson et al. ............... 137/1 |
| 6,406,605 B1 * | 6/2002 | Moles .......................... 204/601 |
| 7,137,404 B2 | 11/2006 | Ejiri |
| 2004/0136843 A1 * | 7/2004 | Jahn et al. ................... 417/395 |
| 2006/0054226 A1 | 3/2006 | Yamazaki et al. |
| 2007/0026269 A1 | 2/2007 | Nakakubo |
| 2007/0068578 A1 | 3/2007 | Ejiri |

FOREIGN PATENT DOCUMENTS

| JP | 3-107687 A | 5/1991 |
| JP | 10-141540 A | 5/1998 |
| JP | 2004-31199 A | 1/2004 |
| JP | 2004-280232 A | 10/2004 |

OTHER PUBLICATIONS

JP 2004-03119 Toru Nakakubo et al. Jan. 29, 2004 Machine Translation.*
JP 2004-280232 Takashi Ejiri Oct. 7, 2004 Machine Translation.*
Hal Jerman, "Electrically Activated, Normally-Closed Diaphragm Valves," 4 J. Micromech. Microeng. 210-16 (1994).
Translation of Office Action in Japanese Application No. 2006-232820 (Aug. 22, 2011).

* cited by examiner

*Primary Examiner* — Ljiljana Ciric
*Assistant Examiner* — Travis Ruby
(74) *Attorney, Agent, or Firm* — Fitzpatrick, Cella, Harper & Scinto

(57) ABSTRACT

A set pressure controller capable of easily controlling the pressure, releasing a load in an environment at a predetermined temperature or higher and allowing for the formation of a compact structure, a valve having the pressure controller, and a fuel cell equipped with the valve having the pressure controller are provided. The pressure controller includes a movable part to be driven by a differential pressure, wherein the pressure controller is attachable to the valve. The pressure controller attached to the valve provides the movable part with a predetermined displacement to control the set pressure.

17 Claims, 13 Drawing Sheets

| TEMPERATURE [°C] | 20 | 25 | 50 | 100 |
|---|---|---|---|---|
| DISSOCIATION PRESSURE [atm] | 1.5 | 2 | 4 | 20 |

PRESSURE CONTROLLER, VALVE HAVING PRESSURE CONTROLLER, AND FUEL CELL EQUIPPED WITH VALVE HAVING PRESSURE CONTROLLER

BACKGROUND OF THE INVENTION

1. Field of the Invention

The present invention relates to a pressure controller, a valve having a pressure controller, and a fuel cell equipped with a valve having a pressure controller.

2. Description of the Related Art

There are various known types of valves. For example, a pressure reducing valve has a function of reducing the pressure of a primary side and keeping the pressure of a secondary side constant, and a safety valve has a function of dissipating the pressure to the exterior when a set pressure is reached.

Also, valves are mainly classified as active drive type and passive drive type valves. The active drive type valve is equipped with a sensor, such as a pressure sensor, valve driving means and a controller. On the other hand, a pressure reducing passive drive type valve automatically opens and closes utilizing the bending of a diaphragm by a differential pressure or the like.

For example, for regulating a set pressure of a passive drive type pressure reducing valve, there often has been utilized a mechanism, which is equipped with a spring that transmits a force to a valve member and in which a bend state of the spring is changed by a handle or the like. As an example of such mechanism, Japanese Patent Application Laid-open No. 2004-280232 discloses a pressure reducing valve having a pressure setting mechanism with a spring.

On the other hand, compact fuel cells are attracting attention as an energy source for mounting in a compact electric instrument.

The fuel cell is useful as a drive source for the compact electric instrument, because the energy that can be supplied per unit volume or per unit weight is several times to almost ten times that provided by the prior lithium ion secondary battery.

Particularly in a fuel cell for providing a large output, it is optimal to utilize hydrogen as the fuel.

However, since hydrogen is gaseous at the normal temperature, technology for storing hydrogen at a high density in a small fuel tank is required.

The following hydrogen storage methods are known.

A first method is to compress and store hydrogen in a state of a high-pressure gas. With the gas pressure of 200 atm. in the tank, the volume density of hydrogen becomes about 18 mg/cm$^3$. A second method is to cool hydrogen to a low temperature and to store it as a liquid. This method is capable of a high-density storage, although there is a drawbacks in that a large amount of energy is required for liquefying hydrogen and that hydrogen may spontaneously gasify and leak.

A third method is to store hydrogen using a hydrogen storage alloy. This method has a drawback in that the fuel tank becomes heavy because the hydrogen storage alloy having a large specific gravity can absorb only about 2% by weight of hydrogen, but is effective for compaction because the absorption amount on volume basis is large.

In a polymer electrolyte fuel cell, electric power generation is conducted in the following manner. As a polymer electrolyte membrane, a cation exchange resin based on perfluorosulfonic acid is often utilized.

For such membrane, for example, DuPont's Nafion is well known. A membrane electrode assembly, which is formed by sandwiching a polymer electrolyte membrane with a pair of porous electrodes bearing a catalyst, such as platinum, namely with a fuel electrode and an oxidizer electrode, constitutes a power generating cell. By supplying the oxidizer electrode with an oxidant and the fuel electrode with a fuel in such power generating cell, protons move across the polymer electrolyte membrane to generate electric power.

The polymer electrolyte membrane generally has a thickness of about 50 to about 100 μm in order to maintain mechanical strength and in order for the fuel gas not to permeate through the membrane. Such a polymer electrolyte membrane has a strength of about 3 to about 5 kg/cm$^2$.

Therefore, in order to prevent the membrane from being broken by differential pressure, it is preferable to limit the differential pressure between an oxidizer electrode chamber and a fuel electrode chamber in a fuel cell to 0.5 kg/cm$^2$ or less in an ordinary state and to 1.0 kg/cm$^2$ or less even in an abnormal state.

If the differential pressure between a fuel tank and the oxidizer electrode chamber is smaller than the above-described differential pressure, the fuel tank and the fuel electrode chamber may be directly connected without any pressure reduction.

However, if the oxidizer electrode chamber is open to the atmosphere and the fuel is filled at a higher density, it becomes necessary to reduce the pressure in the course of supplying fuel from the fuel tank to the fuel electrode chamber.

Also, the aforementioned mechanism is required for starting or terminating a power generating operation and in order to stabilize the generated electric power. Japanese Patent Application Laid-open No. 2004-31199 discloses a technology of providing a compact valve between a fuel tank and a fuel cell unit, thereby preventing the fuel cell unit from breakage due to a large differential pressure, also controlling the start and termination of the power generation and stabilizing the generated electric power.

More specifically, a diaphragm is provided at the boundary between a fuel supply path and an oxidizer supply path and is directly connected with the valve to drive the valve by a differential pressure between the fuel supply path and the oxidizer supply path without utilizing electric power, thereby providing a pressure reducing valve, which optimally controls the pressure of the fuel supplied to the fuel cell unit.

For forming a compact valve, it is possible to utilize semiconductor working technologies in addition to fine mechanical working technologies.

The semiconductor working technologies are advantageous in that they can be used on a submicron level and in that they are easily capable of being used in mass production by a batch process.

H. Jerman, J. Micromech. Microeng., 4, 210, 1994 discloses an active drive type microvalve utilizing a plurality of semiconductor substrates as materials and a semiconductor working technology. This microvalve is driven by applying a voltage to PZT.

It is possible to make a valve compact utilizing conventional mechanical working/assembling technologies, or semiconductor working technologies.

However, particularly in with respect to a passive drive type valve, although it may be possible to set the pressure at a certain value in a design stage, it is difficult after the manufacture of the valve, to control the set pressure according to the situation.

This is because, when the valve is made compact, it is difficult to provide a controlling spring or a controlling handle as in the conventional pressure reducing valve, and it is also difficult to manipulate and control such controlling members.

SUMMARY OF THE INVENTION

In consideration of the aforementioned problems, the present invention is directed to a set pressure controller capable of easily controlling a set pressure and capable of providing a compact structure, a valve having the pressure controller, and a fuel cell equipped with such a valve having the pressure controller.

The present invention is also directed to a set pressure controller capable, in addition to the aforementioned functions, of releasing a load in an environment at a predetermined temperature or higher, a valve having the pressure controller, and a fuel cell equipped with such a valve.

In order to solve the aforementioned problems, the present invention is to provide a pressure controller constructed as shown below, a valve having the pressure controller, and a fuel cell equipped with the valve having the pressure controller.

The pressure controller of the present invention is for controlling a set pressure of a valve including a movable part to be driven by the differential pressure, wherein the pressure controller is attachable to the valve, and the pressure controller attached to the valve provides the movable part with a predetermined displacement to control the set pressure.

In the pressure controller of the present invention, it is preferable that the movable part is constituted of at least one selected from a diaphragm, a poppet, a piston and a valve member.

In the present invention, it is also preferable that the pressure controller further includes a spring member for providing the movable part with the displacement.

In the pressure controller of the present invention, it is also preferable that the spring member is a member including a plate spring.

In the present invention, it is also preferable that the pressure controller further includes a member with an elastic material for providing the movable part with the displacement.

In the pressure controller of the present invention, it is also preferable that the spring member includes a temperature-dependent displacing part, which causes a displacement according to a temperature change, and the temperature-dependent displacing part does not provide the movable part with the displacement at a temperature of a threshold value or higher.

In the pressure controller of the present invention, it is also preferable that the member with the elastic material includes a temperature-dependent displacing part, which causes a displacement according to a temperature change, and the temperature-dependent displacing part does not provide the movable part with the displacement at a temperature of a threshold value or higher.

In the pressure controller of the present invention, it is also preferable that the temperature-dependent displacing part is formed of a shape memory alloy.

In the pressure controller of the present invention, it is also preferable that the shape memory alloy is formed of a bimetal.

In the pressure controller of the present invention, it is also preferable that the spring member includes a spring part, a supporting part for supporting the spring part, and a pressurization part provided at the spring part and capable of contacting the movable part.

In the pressure controller of the present invention, it is also preferable that the member including the elastic material includes an elastic part formed of the elastic material, a supporting part for supporting the elastic part, and a pressurization part provided at the elastic part and capable of contacting the movable part.

In the present invention, it is also preferable that the pressure controller further includes a pressure chamber to be adjoined to the movable part for providing the movable part with the displacement.

In the pressure controller of the present invention, it is also preferable that the chamber is equipped with a check valve.

The valve having the pressure controller according to the present invention is a valve having a pressure controller including a movable part described above, wherein a pressure controller described any above attached to the valve provides the movable part with a predetermined displacement to control a set pressure.

In the valve having the pressure controller according to the present invention, it is preferable that the valve is a pressure reducing valve.

Also, the fuel cell of the present invention is a fuel cell equipped with a valve having a pressure controller as described above.

The present invention provides a set pressure controller capable of easily controlling a set pressure and capable of achieving a compact structure, a valve having the pressure controller, and a fuel cell equipped with such a valve.

By attaching the set pressure controller of the present invention to a valve, it is possible to control the set value without changing the structure of the valve itself, as well as to simplify the structure of the valve itself and to make the entire system compact.

Also, the set pressure controller of the present invention in combination with a small pressure reducing valve for controlling a compact fuel cell allows to supply the fuel cell with the fuel under an appropriate pressure and to provide a compact fuel cell system. In the case of attaching the pressure controller to a valve with a different valve setting, the process for the valve itself need not be modified, so that common components may be used to reduce the cost of production.

Also, a set pressure controller can be constructed with a function of releasing the load in an environment at a predetermined temperature or higher in addition to the aforementioned functions. Thus, the valve can function as a temperature-dependent cutoff valve, operable depending on the temperature state, in addition to the being a pressure reducing valve.

Further features of the present invention will become apparent from the following description of exemplary embodiments with reference to the attached drawings.

DESCRIPTION OF THE EMBODIMENTS

The present invention is described in detail below.

Embodiment 1

A microvalve (small pressure reducing valve) constructed utilizing a pressure controller, which constitutes an embodiment of the present invention, and a producing method therefor are described below with reference to the accompanying drawings. However, the present invention is not limited to this valve structure and producing method. The present invention is also effective for valves of different structures, such as a relief valve, and valves produced by other methods, such as by mechanical working.

In a producing method for a microvalve of the present invention, first, a diaphragm part is prepared. Then, a new wafer is bonded thereon.

Then, the valve is prepared by preparing a valve shaft part, further bonding a new wafer thereon, preparing a valve seat and finally releasing the valve seat. The wafers to be employed are preferably those with both surfaces polished.

A method for producing the microvalve of the present embodiment is explained in detail below with reference to the accompanying drawings. FIGS. 1A to 1E and 2A to 2E show process steps in the producing method described above.

Figure 1A:
FIGS. 1A, 1B, 1C, 1D and 1E are schematic views showing the steps for producing a microvalve of the present invention.

A first step shown in FIG. 1A is a step of forming an alignment mark for a positional alignment on a new wafer surface.

As the wafer, a two-side polished silicon wafer 1 of a thickness of 300 μm was utilized. A photoresist Shipley S1805 was employed and patterned, and an alignment mark 21 of a depth of 30 μm was formed by ICP-RIE etching.

Figure 1B:
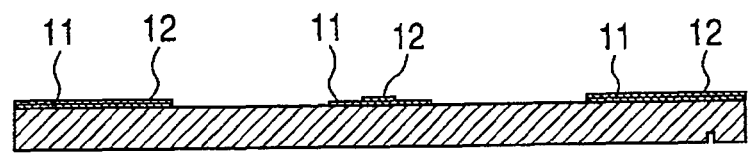

A second step shown in FIG. 1B is a step of preparing masks for a diaphragm, a part of a valve shaft and a supporting part therefor.

At first, two aluminum masks were patterned in succession on a surface of the wafer, opposite to the alignment mark 21 prepared in the first step.

The first aluminum mask 11 was prepared by utilizing Shipley S1805 as the photoresist, patterning it into a mask for forming a diaphragm 24 and a supporting part 22, and executing vacuum evaporation.

Then, the second aluminum mask 12 was prepared by patterning a photoresist in parts for constituting a valve shaft 23 and an outlet flow path 26, and executing vacuum evaporation.

Figure 1C:

A third step shown in FIG. 1C is a step of preparing a diaphragm 24, a part of a valve shaft 23 and a supporting part 22 therefor.

In this step, the silicon wafer was vertically etched by 150 μm by ICP-RIE etching.

Figure 1D:
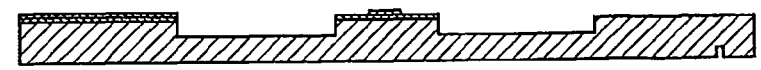

In a fourth step shown in FIG. 1D, only the second aluminum mask 12 was removed by wet etching at a controlled etching time.

Figure 1E:
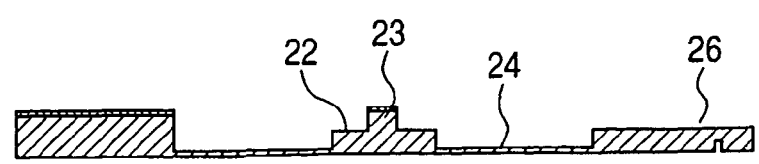

In a fifth step shown in FIG. 1E, the silicon wafer was etched, utilizing the remaining mask, in the vertical direction by 125 μm by ICP-RIE etching. Thus, a silicon wafer part having a thickness of 25 μm remained, thereby constituting the diaphragm 24. Also, an outlet flow path 26 was formed.

Figure 2A:
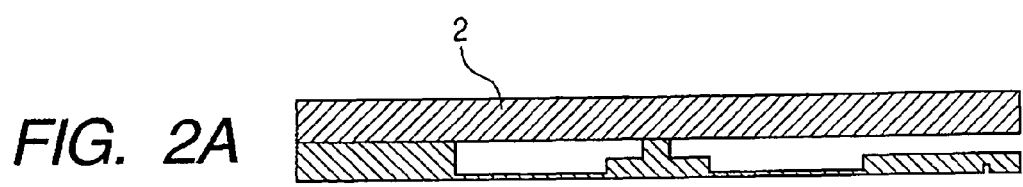
FIGS. 2A, 2B, 2C, 2D and 2E are schematic views showing the steps for producing a microvalve of the present invention, subsequent to the step shown in FIG. 1E.

A sixth step shown in FIG. 2A is a direct bonding step for the wafer. At first, the remaining aluminum mask was removed by a wet etching. A two-side polished silicon wafer having a thickness of 300 μm was subjected at first to SPM cleaning (cleaning in a mixture of hydrogen peroxide and sulfuric acid at 80° C. for 10 minutes), then cleaned with 1% hydrofluoric acid and further subjected to SC1 cleaning (cleaning in a mixture of hydrogen peroxide and ammonia water at 75° C. for 10 minutes).

Then, the wafer 1 obtained after the preceding step and a new wafer 2 were superposed and maintained for 10 minutes under a pressure of 4.5 atm.

Thereafter, the wafers were heated to 1100° C. over 3 hours, and then maintained at this temperature for 4 hours and annealed by spontaneous cooling.

Figure 2B:
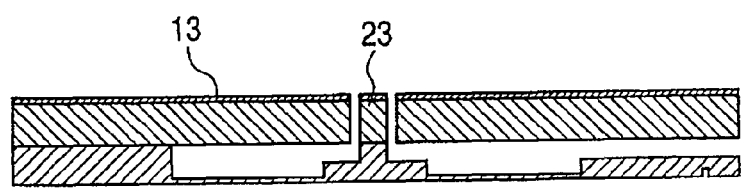

A seventh step shown in FIG. 2B is to prepare a remaining part of the valve shaft 23. After an aluminum film was formed on the surface of the new wafer, a pattern of the valve shaft was formed based on the alignment mark prepared in the first step utilizing a photoresist Shipley S1805. A part constituting the valve shaft was prepared by vertical etching with ICP-RIE.

Figure 2C:
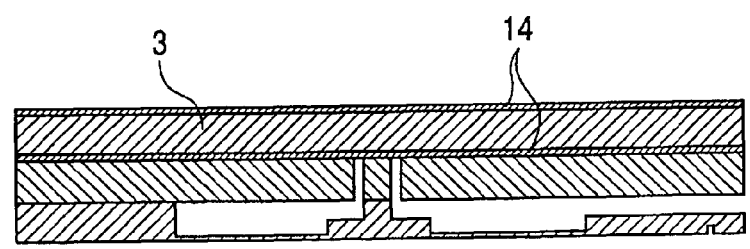

An eighth step shown in FIG. 2C is a step of bonding a wafer for constituting a valve seat. At first, the aluminum mask was removed by wet etching. Thereafter, the sample was ultrasonically cleaned for several minutes.

A surface of a new two-side polished silicon wafer 3 of a thickness of 300 μm was thermally oxidized and was bonded to the wafer processed in the preceding step. The conditions of bonding are the same as in the sixth step.

Figure 2D:
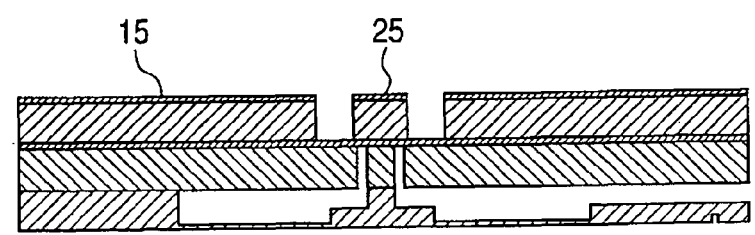

A ninth step shown in FIG. 2D is a step of forming a valve seat. A silicon oxide layer of the wafer on a non-bonded side thereof was removed, and an aluminum film was formed thereon. A valve seat 25 was formed utilizing a photoresist Shipley S1805, and vertical etching was executed by ICP-RIE.

Figure 2E:
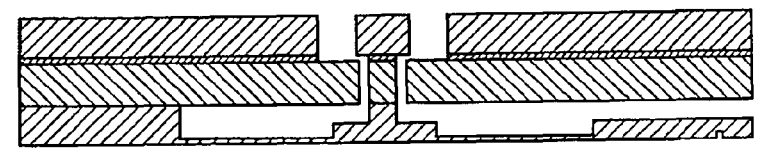

A tenth step shown in FIG. 2E is a step of releasing the valve seat 25. In this step, HF vapor was used to execute the side etching for a length of 25 μm. The etching time was 2 hours.

Figure 3:
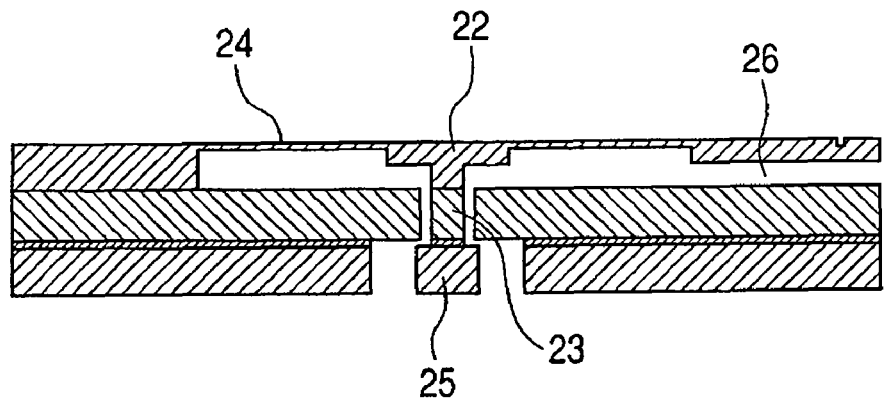
FIG. 3 is a schematic view showing a structure of a microvalve of the present invention.

The function of the microvalve thus prepared is explained below. FIG. 3 is a schematic view showing a cross-section of the microvalve prepared by the producing method described above. In FIG. 3, there are shown a supporting part 22, a valve shaft 23, a diaphragm 24, a valve seat 25, and an outlet flow path 26.

Figure 4A:
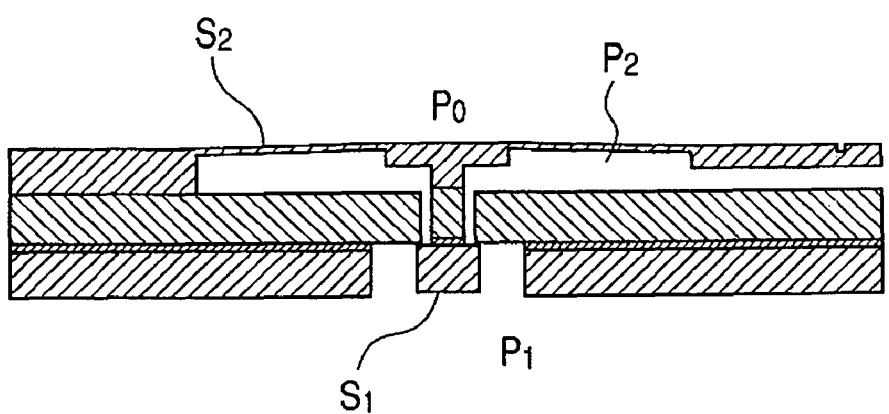
FIGS. 4A and 4B are schematic views showing the opening and closing of the microvalve of the present invention.
Figure 4B:
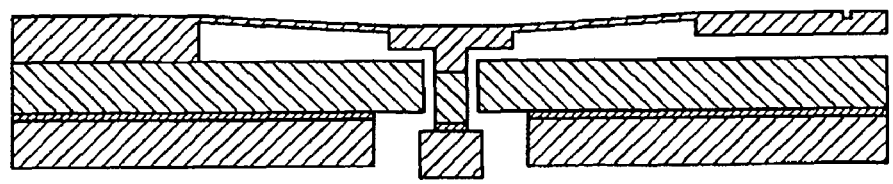

As shown in FIG. 4A, there are assumed a pressure $P_0$ above the diaphragm, a primary pressure $P_1$ at the upstream side of the valve, a pressure $P_2$ at the downstream side of the valve, an area $S_1$ of the valve seat, and an area $S_2$ of the diaphragm. Based on the balance of pressures, a condition required for opening the valve as shown in FIG. 4B is given by: $(P_1-P_2)S_1<(P_0-P_2)S_2$.

The valve is closed or opened respectively when $P_2$ is higher or lower than the pressure given by this condition. Thus, $P_2$ can be maintained at a constant value.

It is possible to design an opening/closing pressure and a flow rate of the valve by regulating an area of the valve seat, an area of the diaphragm, a length of the valve shaft and a thickness of the diaphragm, but it is difficult to change the set pressure after the preparation of the valve.

A pressure controller of the present invention is explained as follows.

Figure 5A:
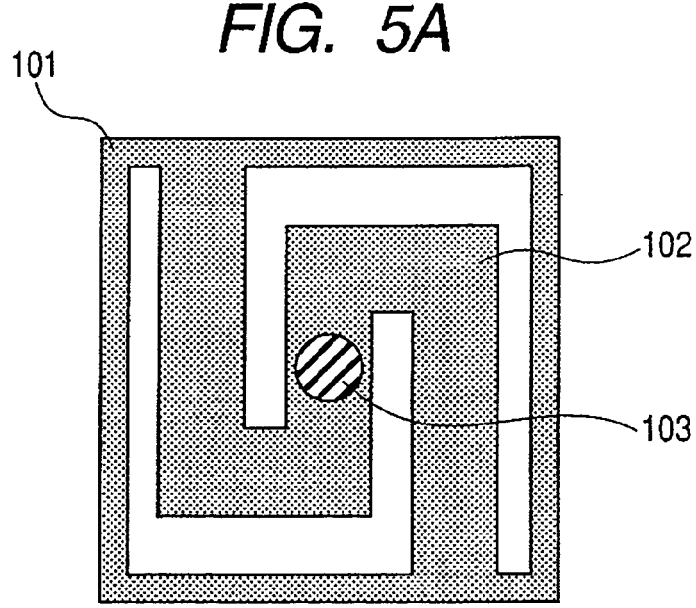
FIGS. 5A and 5B are, respectively, a plan view and an elevation view, schematically showing a pressure controller of the present invention.
Figure 5B:

FIGS. 5A and 5B are schematic views showing a structure of a pressure controller of the present embodiment. FIG. 5A is a schematic plan view showing the structure of the pressure controller of the present invention, and FIG. 5B is a schematic elevation view showing the structure of the pressure controller. The pressure controller is constituted of a peripheral supporting part 101, a spring part 102 and a pressurization part 103.

Figure 6:
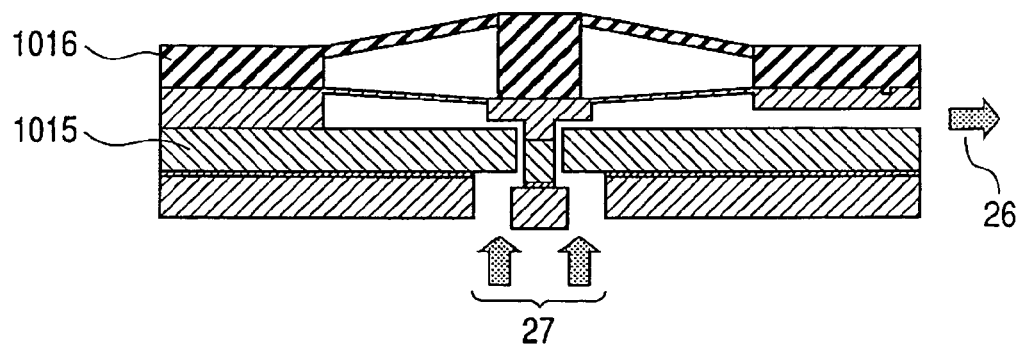
FIG. 6 is a schematic view showing a state in which a pressure controller of the present invention is attached to a microvalve.

FIG. 6 is a schematic cross-sectional view showing a pressure controller 1016 of the present invention mounted on a microvalve 1015. In FIG. 6, there are shown an outlet flow path 26, an inlet flow path 27, a microvalve 1015, and a pressure controller 1016. The mounting may be executed by adhesion with an adhesive material, or by pressing the peripheral supporting part 101 from above by a housing.

Thus, the pressurization part 103 is maintained in contact with the diaphragm of the microvalve and is pressed by the spring part 102.

Thus, an offset is given to the operating pressure of the microvalve.

The set pressure and the valve behavior during operation are determined by a spring constant of the spring part 102 and by a height of the pressurization part 103.

Figure 7A:
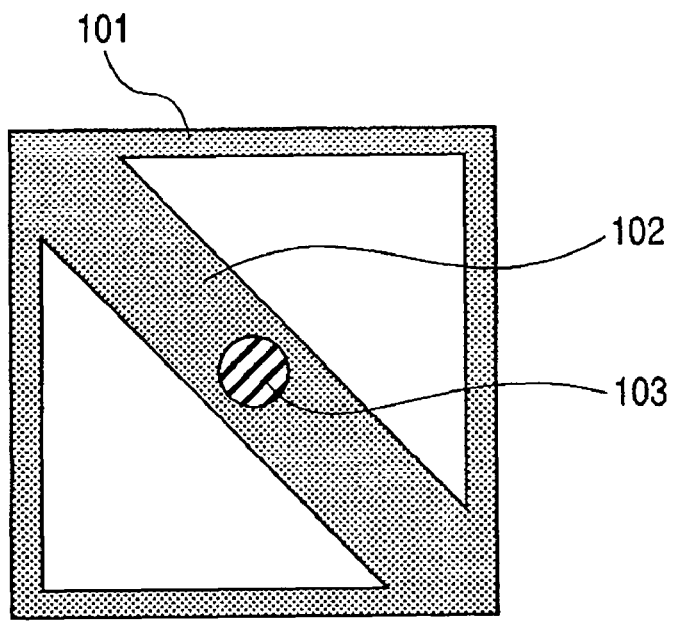
FIGS. 7A and 7B are schematic views showing other embodiments of the pressure controller of the present invention.
Figure 7B:
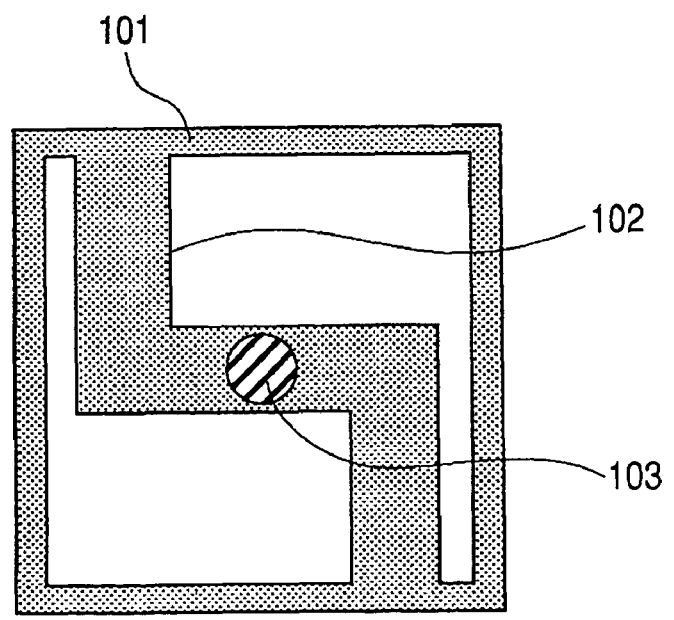

The spring constant of the spring part 102 can be suitably designed by changing a constituting material or by changing the shape, the thickness or the width of the spring as shown in FIGS. 7A and 7B.

A metal, such as stainless steel, aluminum or copper, a semiconductive material, such as silicon, or an organic material, such as polyimide or rubber, can be used as a material for the pressure controller.

It is therefore possible to adopt a structure in which a plate spring is formed as the spring part or in which the pressure controller is formed by an elastic material.

As the working method, cutting or etching may be used for a metal, dry etching or wet etching may be used for a semiconductor, and etching, injection molding or cutting may be used for an organic material.

Also, the pressure controller may be prepared by integral working or by separately preparing and then bonding the pressurization part 103.

Figure 8:
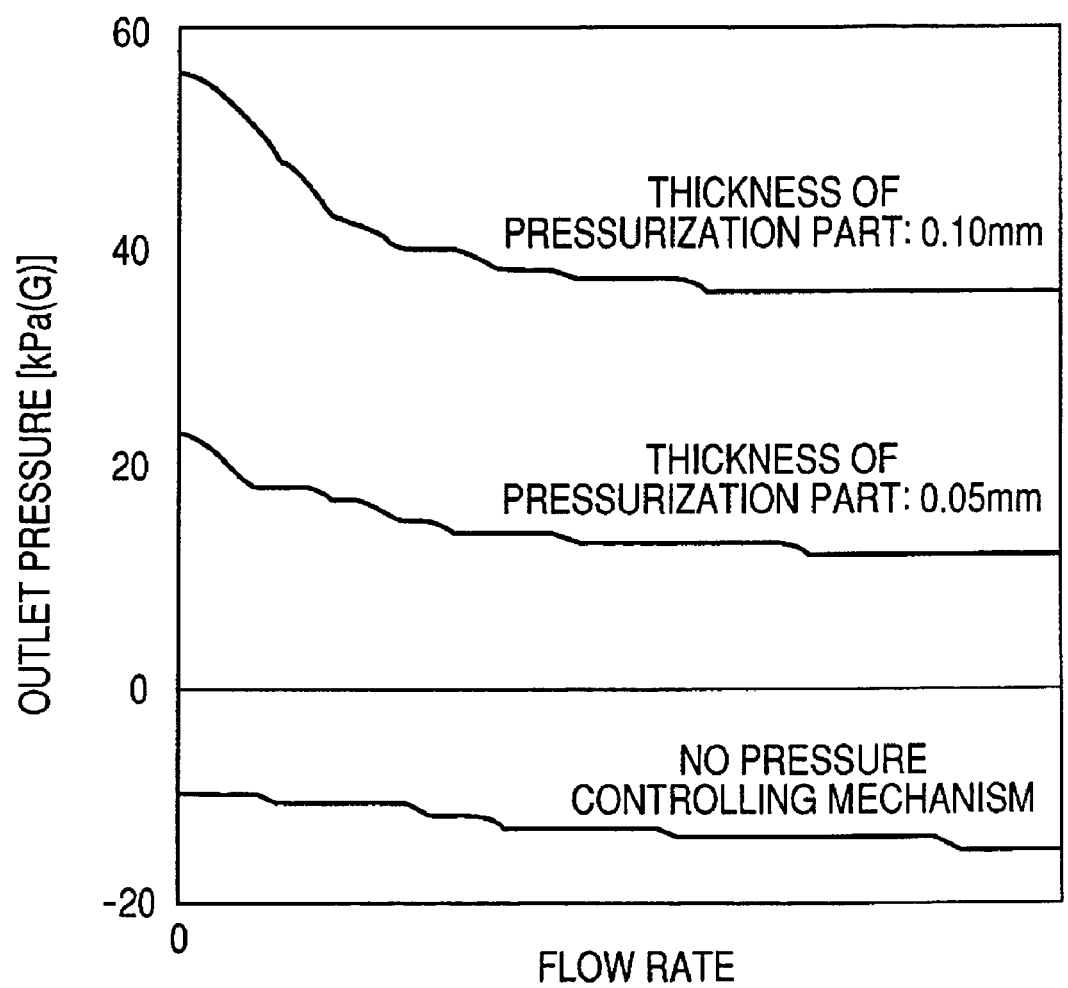
FIG. 8 is a graph showing pressure-flow rate characteristics when a pressure controller of the present invention is attached to a microvalve.

FIG. 8 is a graph showing a change in the operation characteristics of the valve when the pressure controller is formed from stainless steel at a thickness of 0.05 mm and the spring part 102 has a shape as shown in FIG. 7A (external dimension: 8 mm×8 mm), and when the height of the pressurization part 103 is changed.

It will be understood that, with an increase in the height of the pressurization part 103, a larger offset is applied to the operating pressure of the valve.

The valve operation, when the pressurization part 103 is in contact with the microvalve, is determined by a synthesized constant of the spring constant of the spring part 102 and the spring constant of the diaphragm of the valve.

When a large change in the open/close operation of the original microvalve by the pressure controller is undesirable, it is preferable to maintain the spring constant of the spring part 102 as small as possible compared to the spring constant of the diaphragm.

In such a case, the pressure-flow rate characteristics after the control become close to those of the original valve under an offset.

On the other hand, when the spring constant of the spring part 102 is large compared to the spring constant of the diaphragm, the valve operation becomes significantly dependent on the spring constant of the spring part 102.

Figure 9:
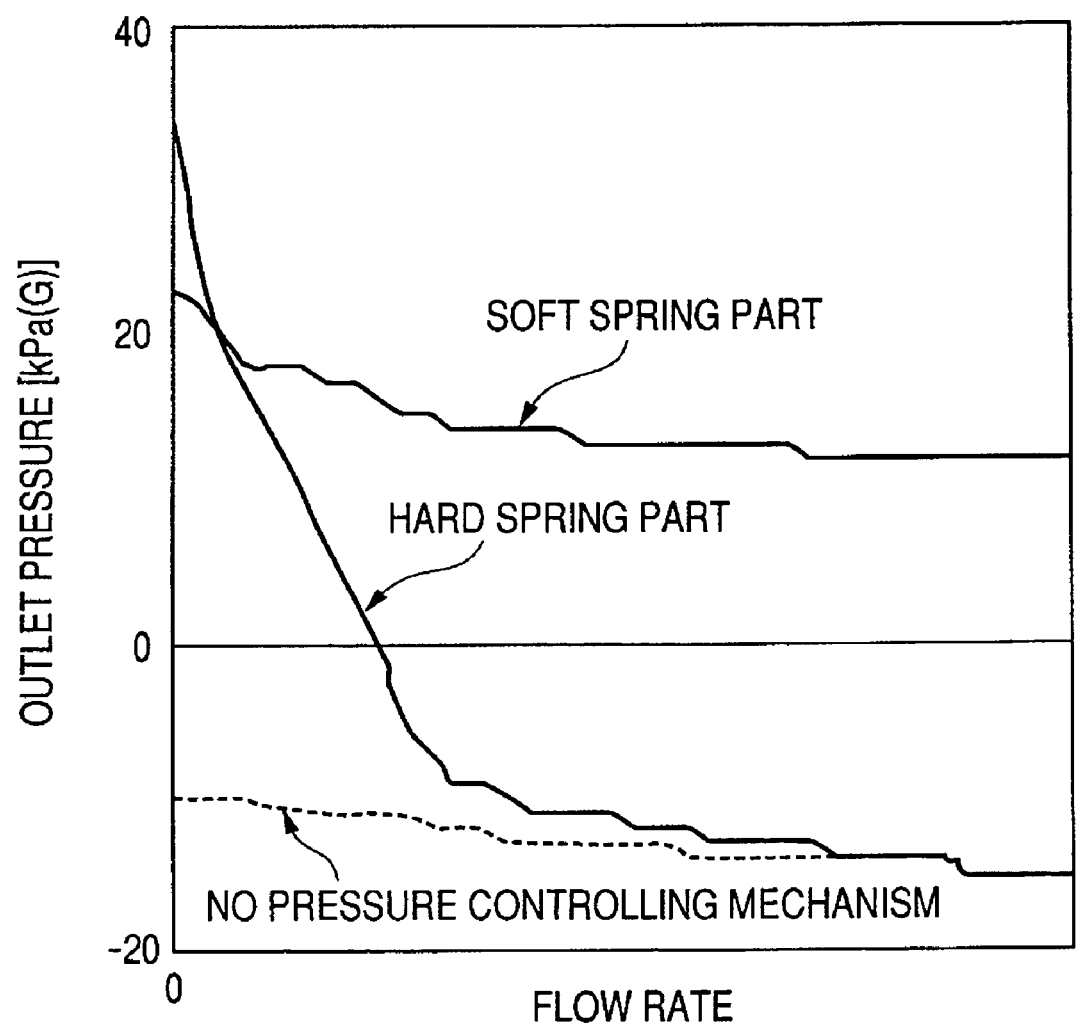
FIG. 9 is a graph showing pressure-flow rate characteristics when a pressure controller of the present invention is attached to a microvalve and a spring constant in a spring part is changed.

FIG. 9 shows a change in the characteristics when the spring constant of the spring part 102 is changed. In such a case, the valve-opening pressure (cracking pressure) increases, but the pressure-flow rate characteristics approach, with an increase in the flow rate, the characteristics before control.

As explained above, the pressure controller of the present embodiment, mounted on a valve, allows to change the pressure-flow rate characteristics without modifying the structure of the valve itself.

Embodiment 2

The second embodiment of the present invention, in which the pressure controller is constituted of a pressure chamber, is explained below.

Figure 10:
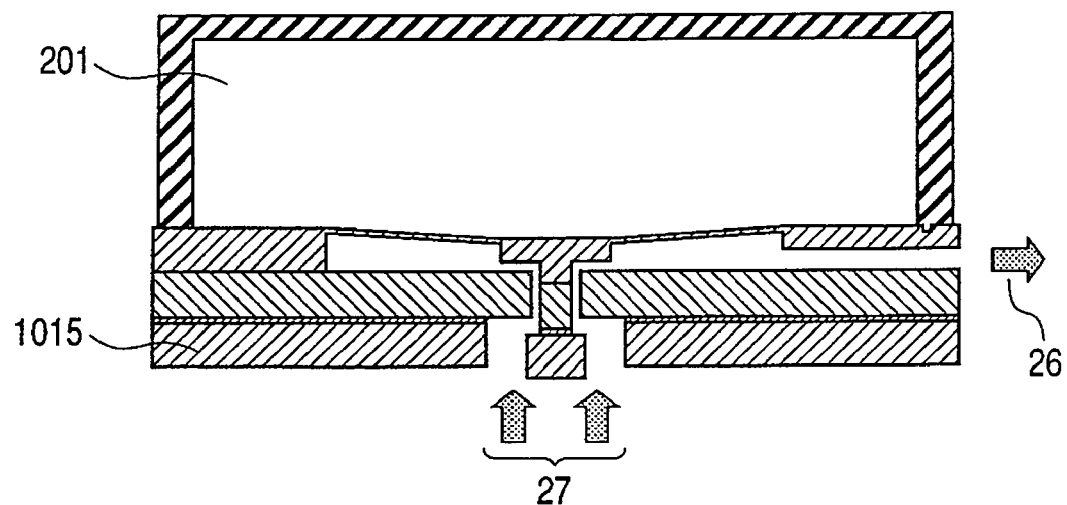
FIG. 10 is a schematic view showing a state in which a pressure controller of the present invention is attached to a microvalve.

The microvalve of the present embodiment can be prepared in the same manner as in Embodiment 1. FIG. 10 is a schematic view showing a state in which the pressure controller of the present embodiment is mounted on a microvalve.

As shown in FIG. 10, the pressure controller of the present embodiment is constituted of a pressure chamber 201.

A space in the pressure chamber 201 is in contact with a side of the diaphragm of the microvalve (namely a side not in contact with the fluid to be controlled by the valve), and a pressure in the chamber may be regulated to change a pressure applied to the diaphragm of the microvalve.

For regulating the pressure in the pressure chamber, there may be utilized a method of assembling and sealing the chamber within a space maintained at the set pressure.

Figure 11:
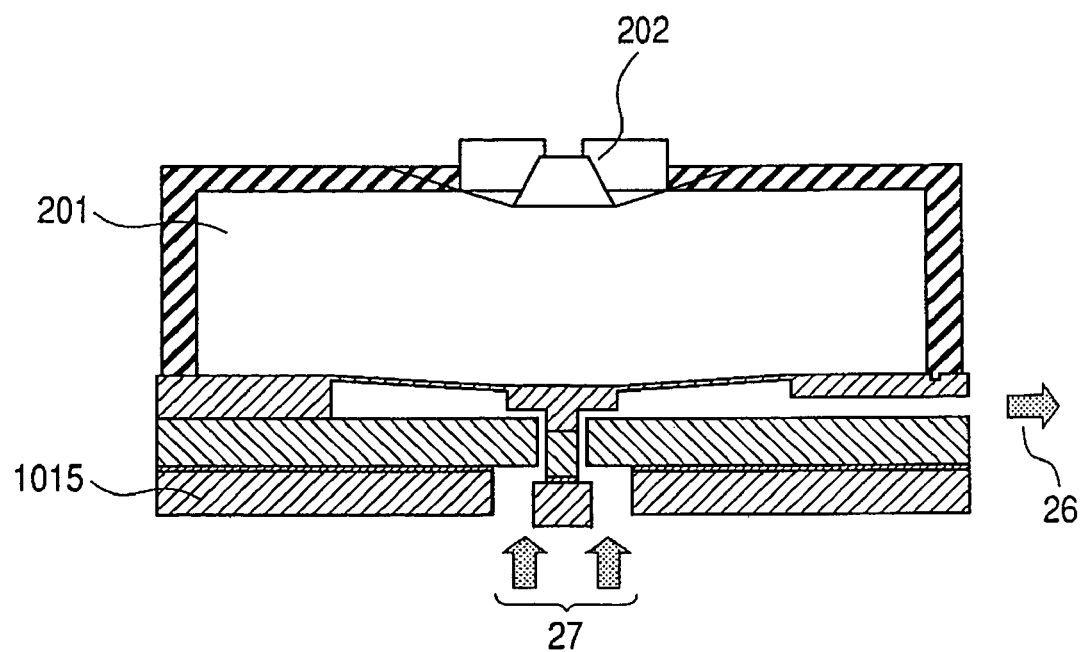
FIG. 11 is a schematic view showing a state in which a pressure controller equipped with a check valve according to the present invention is attached to a microvalve.

It is also possible to provide a check valve 202 as shown in FIG. 11, then to connect a tube to the check valve thereby setting the interior of the chamber as the set pressure and then to detach the tube.

As the fluid to be supplied into the chamber, there may be utilized air or various gases, such as nitrogen, oxygen or hydrogen.

Figure 12:
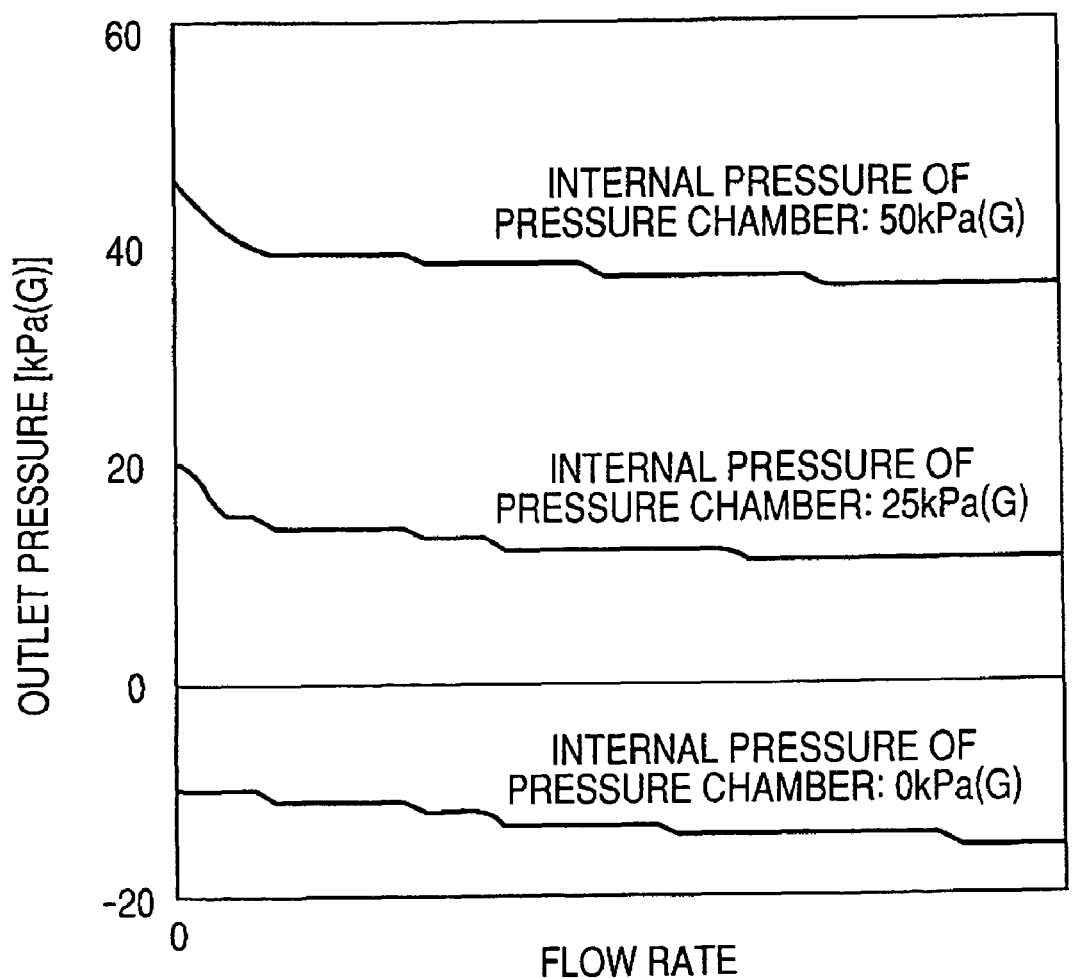
FIG. 12 is a graph showing pressure-flow rate characteristics when a pressure controller of the present invention is attached to a microvalve.

FIG. 12 is a chart showing a change in the characteristics of the microvalve when the pressure in the pressure chamber 201 is changed.

It can be seen that an offset is applied to the secondary pressure of the microvalve 1015 according to the pressure of the fluid in the pressure chamber 201. Also, the set pressure may be selected not only as a positive pressure, but also as a negative pressure.

Embodiment 3

A structure including, as the third embodiment of the present invention, a temperature-dependent displacing part in addition to the peripheral supporting part, the spring part and the pressurization part explained in Embodiment 1 is explained below. The microvalve employed in the present embodiment can be prepared in the same manner as in Embodiment 1.

Figure 13:
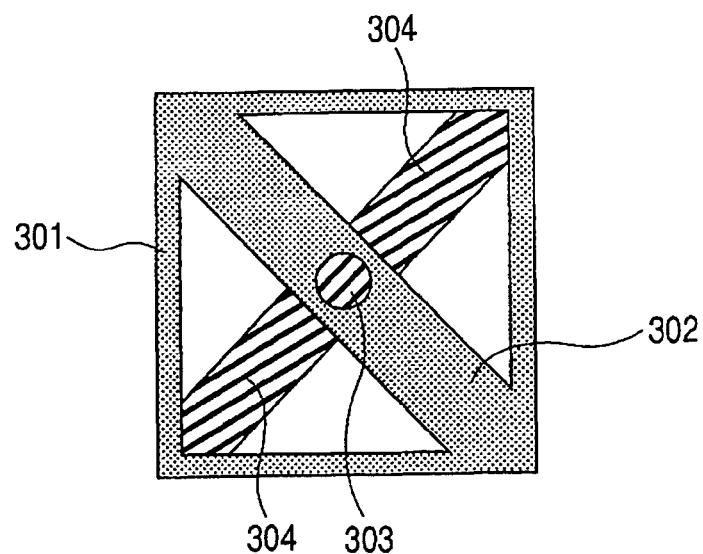
FIG. 13 is a schematic view showing a pressure controller of the present invention.

FIG. 13 is a schematic plan view for explaining the structure of the pressure controller of the present embodiment. The pressure controller of the present embodiment is constituted of a peripheral supporting part 301, a spring part 302, a pressurization part 303, and a temperature-dependent displacing part 304.

Figure 14:
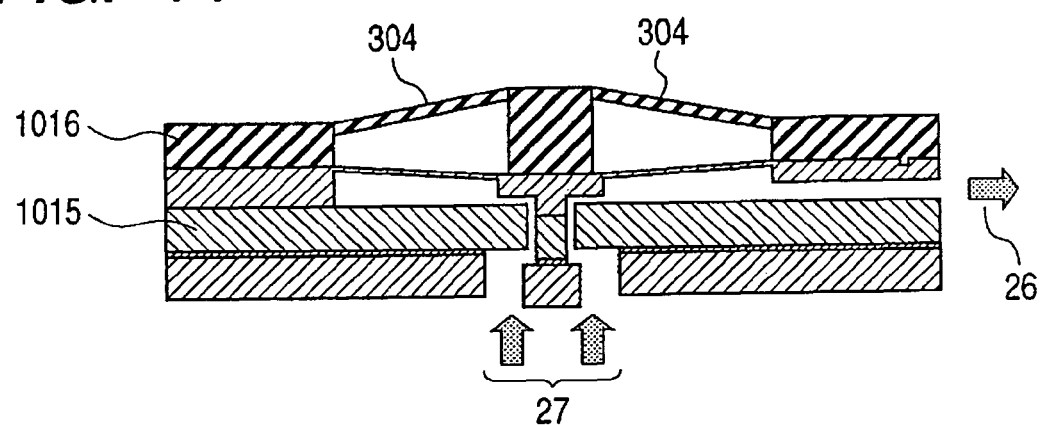
FIG. 14 is a schematic view showing a state in which a pressure controller of the present invention is attached to a microvalve.

FIG. 14 is a schematic cross-sectional view when the pressure controller 1016 of the present embodiment is mounted on a microvalve 1015.

In the pressure controller 1016, as in Embodiment 1, the pressurization part 303 contacts the diaphragm of the microvalve and is pressed by the spring part 302.

The temperature-dependent displacing part 304 is formed by a shape memory alloy, such as a titanium-nickel alloy, and, at an ordinary temperature, it executes a plastic deformation and does not influence the pressurization of the spring part 302.

Figure 15:
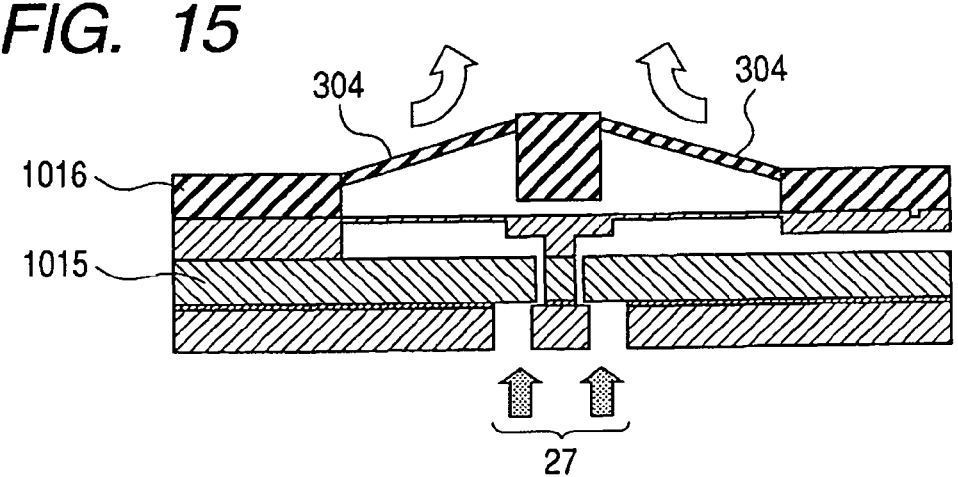
FIG. 15 is a schematic view showing a state in which a pressure controller of the present invention is attached to a microvalve, and a temperature-dependent displacing part is displaced.

When an ambient temperature of the microvalve rises abnormally and reaches or exceeds a preset temperature, the shape memory alloy of the temperature-dependent displacing part 304 is bent and displaced, as shown in FIG. 15, in a non-pressurizing direction (upward direction in case of FIG. 15).

As a result, the pressurization part 303 is released from the diaphragm of the microvalve and no longer executes the pressurization.

Figure 16:
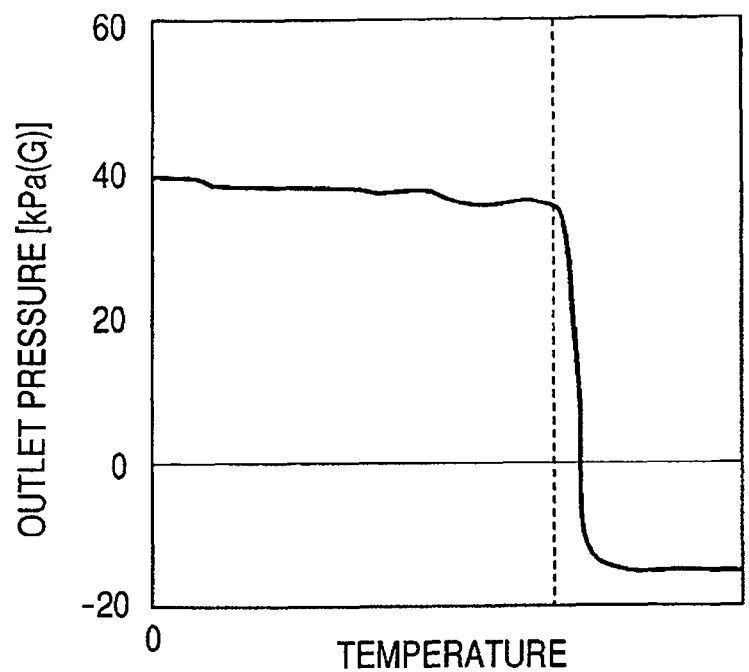
FIG. 16 is a graph showing pressure-temperature characteristics when a pressure controller of the present invention is attached to a microvalve.

In this state, the secondary pressure of the microvalve shows a change, as shown in FIG. 16. Within a range where the temperature is lower than the threshold value (broken line), the temperature-dependent displacing part 304 does not function, so that the secondary pressure depends on the normal pressurization by the pressurization part 303, as indicated in Embodiment 1.

When the temperature is further elevated and exceeds the threshold value, the shape memory alloy of the temperature-dependent displacing part 304 functions to lift up the pressurization part 303, whereby the valve functions as a normally closed valve driven by the negative pressure and is thus closed.

When the temperature becomes lower than the threshold value, the valve functions as an ordinary pressure reducing valve and is therefore reversibly usable. The pressure controller, provided with the temperature-dependent displacing part 304 formed by the shape memory alloy functions as a pressure reducing valve below the threshold temperature and as a cutoff valve at or above the threshold temperature, and can therefore provide a more safe valve mechanism.

The present embodiment shows an example of utilizing a shape memory alloy as the temperature-dependent displacing part 304, but a similar effect can be obtained by utilizing a material that can displace depending on the temperature (for example, a bimetal). Also, the present embodiment shows an example in which the spring part 302 and the temperature-dependent displacing part 304 are disposed at different positions, but the temperature-dependent displacing part 304 may perform these functions by utilizing a metal material or the like having a property of a spring.

Embodiment 4

The present embodiment shows a fuel cell with a microvalve controlled by the pressure controller of the present invention.

Figure 17:
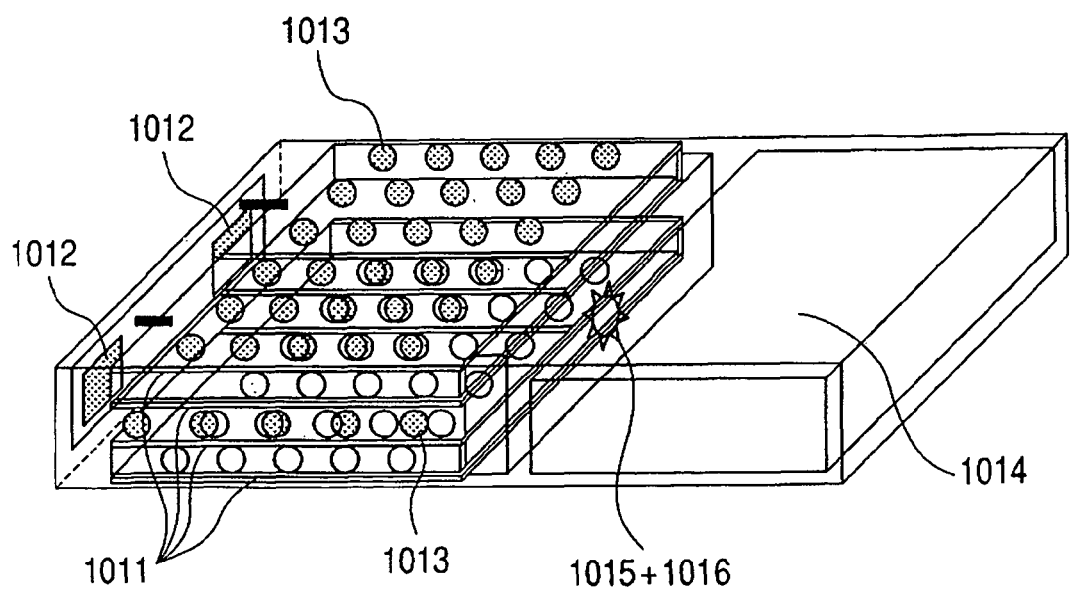
FIG. 17 is a schematic view showing a fuel cell of the present invention.
Figure 18:
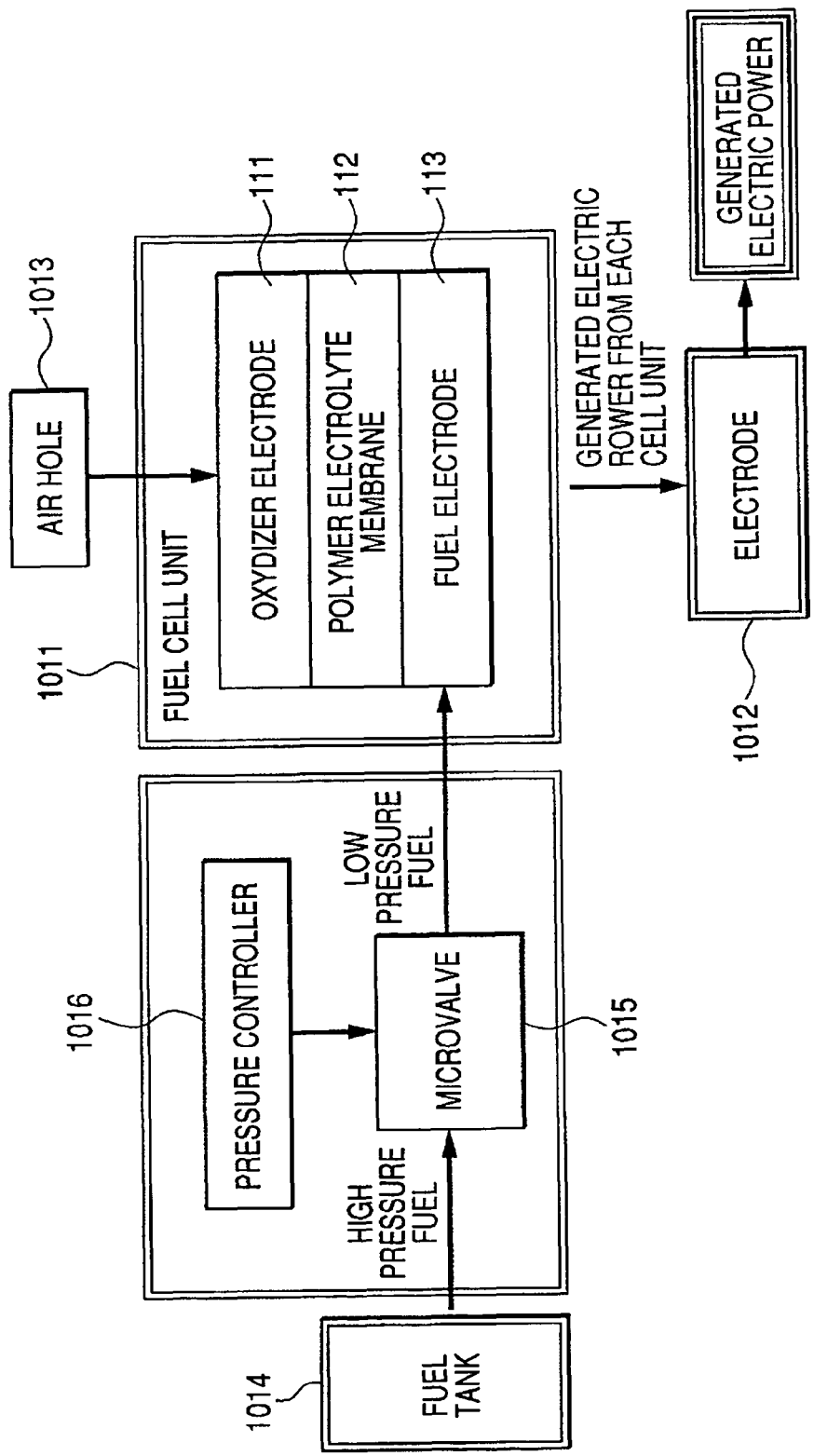
FIG. 18 is a block diagram for explaining a fuel cell of the present invention.

FIG. 17 is a schematic view showing a fuel cell of the present embodiment. Also, FIG. 18 is a block diagram for explaining a fuel cell system of the present embodiment. The external dimensions of a fuel cell in the present embodiment are 50 mm×30 mm×10 mm, which is approximate the same as the size of a lithium ion battery often employed in compact digital cameras. Thus, the fuel cell of the present embodiment, being compact and integrally structured, is of a shape that is easily incorporated into portable equipment.

The fuel cell of the present embodiment, in order to obtain oxygen to be used as the oxidizer from the atmosphere, has aerating holes 1013 for air intake on the upper and lower faces and on the lateral faces.

These holes also serve to discharge the generated water as vapor and to dissipate the heat generated by the reaction.

Electrodes 1012 are disposed on a lateral face to collect the electric power generated by the cell.

The interior is constituted of fuel cell units 1011, each formed by a polymer electrolyte membrane 112, an oxidizer electrode 111 and a fuel electrode 113, a fuel tank 1014 for storing the fuel, and a microvalve 1015 connecting the fuel tank and the fuel electrode of each cell unit and controlling the flow rate of the fuel.

The fuel tank 1014 of the present embodiment is explained below. The interior of the tank is filled with a hydrogen storage alloy capable of storing hydrogen. It has to be used with a differential pressure of 0.1 MPa or less to the external atmosphere, since the polymer electrolyte membrane employed in a fuel cell has a pressure resistance from 0.3 to 0.5 MPa.

For example, $LaNi_5$ is used as a hydrogen storage alloy having a hydrogen dissociation pressure of 0.2 MPa at normal temperature.

Assuming that the fuel tank has a volume equal to a half of that of the entire fuel cell and that the tank has a wall thickness of 1 mm and is formed from stainless steel, the capacity of the fuel tank becomes 5.2 $cm^3$.

Since $LaNi_5$ is capable of absorbing and releasing hydrogen in an amount of 1.1 wt % per unit weight, hydrogen accumulated in the fuel tank, at a fill rate of 50%, reaches 0.2 g and can generate an electric power of about 5 [W·hr].

On the other hand, in case of utilizing a hydrogen storage material in which hydrogen dissociation pressure exceeds 0.2 MPa at the normal temperature, a microvalve 1015 for pressure reduction has to be provided between the fuel tank 1014 and the fuel electrode 113.

Figures 19, 20:
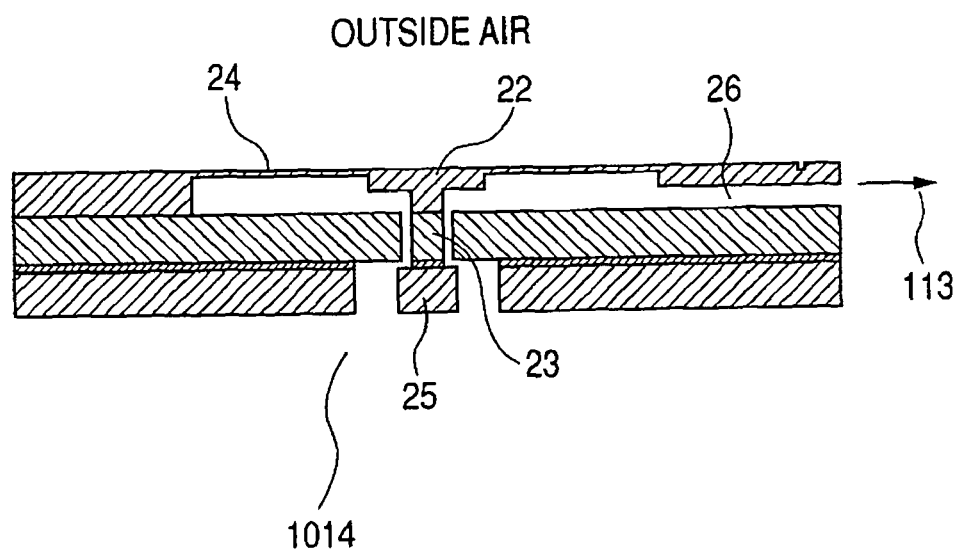
FIG. 19 is a table showing a dissociation pressure of a hydrogen storage alloy ($LaNi_5$) in the fuel cell of the present invention.
FIG. 20 is a schematic view showing a positional relationship of a microvalve in the fuel cell of the present invention.

The dissociation pressure of LaNi$_5$ at each temperature is shown in FIG. 19. The hydrogen accumulated in the tank is supplied to the fuel electrode 113 after a pressure reduction in the microvalve 1015.

Also, external air is supplied through the aerating holes 1013 to the oxidizer electrode 111.

The electric power generated in the unit fuel cells is supplied from the electrodes 1012 to the compact electric equipment.

FIG. 20 is a schematic view showing a microvalve of Embodiment 1 mounted on a fuel cell. The primary side of the microvalve is connected with the fuel tank 1014. An outlet flow path 26 is connected to the fuel electrode 113, and a face of the diaphragm 24, opposite to the outlet flow path, is in contact with the oxidizer electrode (external atmosphere).

The entire size of the valve is less than 1 cm square, and the size of the valve member is 1 mm square or less. Such a small valve mechanism allows a controller for the fuel flow rate to be incorporated into a compact fuel cell.

The open/closing operation of the valve in the power generation of the fuel cell is explained as follows.

While the power generation is stopped, the microvalve 1015 remains closed. When the power generation is started, the fuel in the fuel electrode chamber is consumed, whereby the pressure thereof decreases.

The diaphragm 24 is bent toward the fuel electrode chamber by a differential pressure between the external atmosphere and the pressure in the fuel electrode chamber, whereby the valve seat 25, connected by the valve shaft 23 to the diaphragm 24, is pressed down to open the valve.

Thus, the fuel is supplied from the fuel tank 1014 to the fuel electrode chamber 113. When the pressure in the fuel electrode chamber is restored, the diaphragm 24 is pushed up to close the microvalve 1015.

Characteristics of the fuel cell vary by the pressure of the supplied fuel. Thus, an appropriate pressure can be maintained by mounting the pressure controller of the present invention on the microvalve to be mounted on the fuel cell, thereby controlling the open/close pressure of the microvalve. It is thus possible to avoid a breakage in the fuel flow path of the fuel cell and to exhibit satisfactory power generating characteristics.

Also, by applying the pressure controller of Embodiment 3, having the temperature-dependent displacing part, to the fuel cell, it is possible to automatically cut off the fuel supply when the fuel cell reaches an abnormally high temperature due to any cause, thereby providing a structure with a higher safety.

While the present invention has been described with reference to exemplary embodiments, it is to be understood that the invention is not limited to the disclosed exemplary embodiments. The scope of the following claims is to be accorded the broadest interpretation so as to encompass all such modification and equivalent structure and functions.

This application claims the benefit of Japanese Patent Application Nos. 2005-265788, filed Sep. 13, 2005, and 2006-232820, filed Aug. 29, 2006, which are hereby incorporated by reference herein in their entirety.

What is claimed is:

1. A pressure controller for controlling a set pressure of a valve, the valve comprising a valve shaft and a movable part comprising a diaphragm to be driven by a differential pressure, wherein the pressure controller is attachable to and detachable from the valve, and the valve is functional when the pressure controller is detached, wherein, when the pressure controller is attached to the valve, the pressure controller provides the movable part of the valve with a predetermined displacement to control the set pressure, wherein the diaphragm has a first surface and a second surface, which is opposite to the first surface, wherein the first surface of the diaphragm faces a downstream side of the valve shaft, wherein the diaphragm is not in contact with a space of an upstream side of the valve shaft, and wherein the diaphragm drives the valve shaft by being displaced by the differential pressure between a space of the downstream side of the valve shaft and a space facing the second surface of the diaphragm.

2. The pressure controller according to claim 1, further comprising a spring member for providing the movable part with the displacement.

3. The pressure controller according to claim 2, wherein the spring member includes a temperature-dependent displacing part that causes a displacement according to temperature change, and the temperature-dependent displacing part does not provide the movable part with a displacement at a temperature of a threshold value or higher.

4. The pressure controller according to claim 3, wherein the temperature-dependent displacing part is formed of a shape memory alloy.

5. The pressure controller according to claim 4, wherein the shape memory alloy is formed of a bimetal.

6. The pressure controller according to claim 2, wherein the spring member is a member including a plate spring.

7. The pressure controller according to claim 2, wherein the spring member comprises a spring part, a supporting part for supporting the spring part, and a pressurization part provided at the spring part and capable of contacting the movable part.

8. The pressure controller according to claim 1, further comprising a member comprising an elastic material for providing the movable part with the displacement.

9. The pressure controller according to claim 8, wherein the member comprising the elastic material includes a temperature-dependent displacing part that causes a displacement according to temperature change, and the temperature-dependent displacing part does not provide the movable part with a displacement at a temperature of a threshold value or higher.

10. The pressure controller according to claim 8, wherein the member comprising the elastic material includes an elastic part formed of an elastic material, a supporting part for supporting the elastic part, and a pressurization part provided at the elastic part and capable of contacting the movable part.

11. The pressure controller according to claim 1, further comprising an independent pressure chamber that is not in communication with flow paths within the valve for providing the movable part with the displacement, where fluid in the valve is present regardless of opening and closing of the valve, the pressure chamber to be adjoined to the movable part.

12. The pressure controller according to claim 11, wherein the chamber is equipped with a check valve.

13. The pressure controller according to claim 1, wherein the valve is structured as a laminate of a plate member.

14. The pressure controller according to claim 13, wherein the plate member is formed of a silicon substrate and is produced by a semiconductor process.

15. A valve having a pressure controller for controlling a set pressure of the valve, the valve comprising a valve shaft and a movable part comprising a diaphragm to be operated by a differential pressure, wherein the pressure controller provides the movable part of the valve with a predetermined displacement to control the set pressure, wherein the diaphragm has a first surface and a second surface, which is opposite to the first surface, wherein the first surface of the diaphragm faces a downstream side of the valve shaft, wherein the diaphragm is not in contact with a space of an upstream side of the valve shaft, and wherein the diaphragm drives the valve shaft by being displaced by the differential pressure between a space of the downstream side of the valve shaft and a space facing the second surface of the diaphragm.

16. The valve having the pressure controller according to claim 15, wherein the valve is a pressure reducing valve.

17. A fuel cell comprising the valve equipped with the pressure controller according to claim 15.

* * * * *